US009419833B2

(12) United States Patent
Wang et al.

(10) Patent No.: US 9,419,833 B2
(45) Date of Patent: Aug. 16, 2016

(54) PHASE CONTROL METHOD, ARRAY ANTENNA, AND SYSTEM

(71) Applicant: Huawei Technologies Co., Ltd., Shenzhen (CN)

(72) Inventors: Qiang Wang, Shenzhen (CN); Zhiqiang Liao, Shenzhen (CN); Bin Wang, Shenzhen (CN); Ruiming Ding, Shenzhen (CN)

(73) Assignee: Huawei Technologies Co., Ltd., Shenzhen, Guangdong ( * ) Notice: Subject to any disclaimer, the term of this patent is extended or adjusted under 35 U.S.C. 154(b) by 0 days.

(21) Appl. No.: 14/830,609

(22) Filed: Aug. 19, 2015

(65) Prior Publication Data

US 2016/0056982 A1   Feb. 25, 2016

(30) Foreign Application Priority Data

Aug. 20, 2014   (CN) .......................... 2014 1 0413565

(51) Int. Cl.
- *H04B 1/38* (2015.01)
- *H04L 27/18* (2006.01)
- *H01Q 3/26* (2006.01)
- *H01Q 3/38* (2006.01)
- *H01Q 21/24* (2006.01)

(52) U.S. Cl.
CPC .............. *H04L 27/18* (2013.01); *H01Q 3/2605* (2013.01); *H01Q 3/38* (2013.01); *H01Q 21/24* (2013.01)

(58) Field of Classification Search
CPC .................................. H04B 1/40; H04B 3/23
USPC ........................................................ 375/219
See application file for complete search history.

(56) References Cited

U.S. PATENT DOCUMENTS

| 6,281,838 B1 | 8/2001 | Hong |
| 2005/0068123 A1 | 3/2005 | DeNatale et al. |

FOREIGN PATENT DOCUMENTS

JP   10285093 A   10/1998

OTHER PUBLICATIONS

S. Lucyszyn 1, et al ("Novel RF MEMS Switches", Optical and Semiconductor Devices Group, Department of Electrical and Electronic Engineering, Imperial College London, Exhibition Road, London, Proceedings of Asia-Pacific Microwave Conference 2007, pp. 55-58).*
Foreign Communication From a Counterpart Application, European Application No. 15180523.1, Extended European Search Report dated Jan. 7, 2016, 7 pages.

* cited by examiner

*Primary Examiner* — Helene Tayong
(74) *Attorney, Agent, or Firm* — Conley Rose, P.C.; Grant Rodolph

(57) ABSTRACT

A phase control method in the present disclosure includes dividing, by a power divider, the high frequency current into at least two current branches, and separately feeding the at least two current branches into corresponding radio frequency input ports on a digital phase shifter, determining, by the switch controller according to the digital control flow, radio frequency paths that are in the digital phase shifter and for the at least two current branches fed into the digital phase shifter, and controlling the drive voltage to act on the digital phase shifter, and separately establishing, by the digital phase shifter according to the drive voltage and for the at least two current branches, radio frequency paths for currents to flow through, and controlling duration of phase delays for the at least two current branches by controlling lengths of the radio frequency paths through which the at least two current branches flow.

20 Claims, 5 Drawing Sheets

| Reference Number | Element |
|---|---|
| 211, 212, 213, 221, 222, and 223 | Phase Shifting Unit |
| 301 and 302 | Radio Frequency Transmission Line |

| Reference Number | Element |
|---|---|
| 221a | Micro Electro Mechanical System (MEMS) Switch |

| Reference Number | Element |
|---|---|
| 10 | Antenna Reflection Board |
| 20 | Radiating Element |
| 30 | High Resistance Base Board I40ncluding a Digital Phase Shifter and a Switch Controller |
| 40 | Radio Frequency Transmission Line |
| 50 | Interface |

PHASE CONTROL METHOD, ARRAY ANTENNA, AND SYSTEM

CROSS-REFERENCE TO RELATED APPLICATION

This application claims priority to Chinese Patent Application No. 201410413565.2, filed on Aug. 20, 2014, which is hereby incorporated by reference in its entirety.

TECHNICAL FIELD

Embodiments of the present disclosure relate to communications technologies, and in particular, to a phase control method, array antenna, and system.

BACKGROUND

Remote electrical tilt antennas are the mainstream of base station antennas nowadays, can control a direction of a radiation beam by using a system, so as to facilitate network planning and real-time adjustment, and therefore, are widely applied by mainstream operators nowadays. A current remote electrical tilt antenna system mainly includes a power divider, an analog phase shifter, a mechanical transmission apparatus, a motor that drives the mechanical transmission apparatus, a radiation array antenna that can generate radiation, and several electrical connection transmission lines. In an entire mobile communications system, the analog phase shifter is configured to change a phase, and all vendors in the industry change a phase of a phase shifter by applying a tension externally, thereby implementing phase shifting. To apply a tension externally is generally implemented in two manners: manually generating the tension and generating the tension by using the motor.

However, with the use of a higher frequency spectrum in the future, the analog phase shifter cannot implement precise phase shifting and angle adjustment, and it is necessary to look for another manner.

SUMMARY

Embodiments of the present disclosure provide a phase control method and system, and an array antenna, to resolve a problem that an analog phase shifter cannot implement precise phase shifting and angle adjustment.

According to a first aspect, an embodiment of the present disclosure provides a phase control method, including feeding, by a base station, a high frequency current into a power divider, and sending a control signal to a switch controller, where the control signal includes a drive voltage and a digital control flow, dividing, by the power divider, the high frequency current into at least two current branches, and separately feeding the at least two current branches into corresponding radio frequency input ports on a digital phase shifter, determining, by the switch controller according to the digital control flow, radio frequency paths that are in the digital phase shifter and for the at least two current branches fed into the digital phase shifter, and controlling the drive voltage to act on the digital phase shifter, and separately establishing, by the digital phase shifter according to the drive voltage and for the at least two current branches, radio frequency paths for currents to flow through, and controlling duration of phase delays for the at least two current branches by controlling lengths of the radio frequency paths through which the at least two current branches flow.

With reference to the first aspect, in a first possible implementation manner of the first aspect, the separately establishing, by the digital phase shifter according to the drive voltage and for the at least two current branches, radio frequency paths for currents to flow through, and controlling duration of phase delays for the at least two current branches by controlling lengths of the radio frequency paths through which the at least two current branches flow includes separately establishing, by the digital phase shifter, the radio frequency paths for the at least two current branches according to connection directions in which the drive voltage drives micro electro mechanical system (MEMS) switches in the digital phase shifter, and by using the MEMS switches and microstrips that connect the MEMS switches, and controlling, by the digital phase shifter, the duration of the phase delays for the at least two current branches by controlling the lengths of the radio frequency paths.

According to a second aspect, an embodiment of the present disclosure provides a phase control system, including: a base station, a power divider, a switch controller, and a digital phase shifter, where the base station is configured to feed a high frequency current into the power divider, and send a control signal to the switch controller, where the control signal includes a drive voltage and a digital control flow, the power divider is configured to divide the high frequency current into at least two current branches, and separately feed the at least two current branches into corresponding radio frequency input ports on the digital phase shifter, the switch controller is configured to determine, according to the digital control flow, radio frequency paths that are in the digital phase shifter and for the at least two current branches fed into the digital phase shifter, and control the drive voltage to act on the digital phase shifter, and the digital phase shifter is configured to separately establish, according to the drive voltage and for the at least two current branches, radio frequency paths for currents to flow through, and control duration of phase delays for the at least two current branches by controlling lengths of the radio frequency paths through which the at least two current branches flow.

With reference to the second aspect, in a first possible implementation manner of the second aspect, the digital phase shifter includes micro electro mechanical system MEMS switches and microstrips that connect the MEMS switches, and the digital phase shifter is configured to separately establish the radio frequency paths for the at least two current branches according to connection directions in which the drive voltage drives the MEMS switches in the digital phase shifter, and by using the MEMS switches and the microstrips; and control the duration of the phase delays for the at least two current branches by controlling the lengths of the radio frequency paths.

With reference to the second aspect or the first possible implementation manner of the second aspect, in a second possible implementation manner of the second aspect, the system further includes at least two radiating elements, where the radiating elements are configured to convert, into microwave signals, the at least two current branches that are output from the digital phase shifter and phase-delayed, and transmit the microwave signals in space.

With reference to the second possible implementation manner of the second aspect, in a third possible implementation manner of the second aspect, the system further includes a rear power divider configured to feed, into the radiating elements, the at least two current branches that are output from the digital phase shifter and phase-delayed.

With reference to the first possible implementation manner of the second aspect, in a fourth possible implementation manner of the second aspect, the MEMS switches are single pole double throw switches.

According to a third aspect, an embodiment of the present disclosure provides an array antenna, where the array antenna is a dual-polarized antenna, and includes: a power divider, a switch controller, a digital phase shifter, and at least two radiating elements, where the power divider is configured to divide a high frequency current into at least two current branches, and separately feed the at least two current branches into corresponding radio frequency input ports on the digital phase shifter, the switch controller is configured to determine, according to the digital control flow, radio frequency paths that are in the digital phase shifter and for the at least two current branches fed into the digital phase shifter, and control the drive voltage to act on the digital phase shifter, the digital phase shifter is configured to separately establish, according to the drive voltage and for the at least two current branches, radio frequency paths for currents to flow through, and control duration of phase delays for the at least two current branches by controlling lengths of the radio frequency paths through which the at least two current branches flow, and the radiating elements are configured to convert, into microwave signals, the at least two current branches that are output from the digital phase shifter and phase-delayed, and transmit the microwave signals in space.

With reference to the third aspect, in a first possible implementation manner of the third aspect, the digital phase shifter includes micro electro mechanical system MEMS switches and microstrips that connect the MEMS switches, and the digital phase shifter is configured to separately establish the radio frequency paths for the at least two current branches according to connection directions in which the drive voltage drives the MEMS switches in the digital phase shifter, and by using the MEMS switches and the microstrips; and control the duration of the phase delays for the at least two current branches by controlling the lengths of the radio frequency paths.

With reference to the third aspect or the first possible implementation manner of the third aspect, in a second possible implementation manner of the third aspect, the array antenna further includes a rear power divider configured to feed, into the radiating elements, the at least two current branches that are output from the digital phase shifter and phase-delayed.

With reference to the first possible implementation manner of the third aspect, in a third possible implementation manner of the third aspect, the MEMS switches are single pole double throw switches.

In a phase control method, array antenna, and system in the embodiments of the present disclosure, an analog phase shifter in an existing remote electrical tilt antenna is replaced with a digital phase shifter that is based on a digital domain, a mechanical transmission apparatus in the existing remote electrical tilt antenna is replaced with a switch controller, and mechanical transmission is no longer needed in the phase control system; in the entire phase control system, a base station can uniformly control phases by using the digital domain to control radio frequency signals, a phase deviation of the digital phase shifter is small, and a beam can be precisely adjusted.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
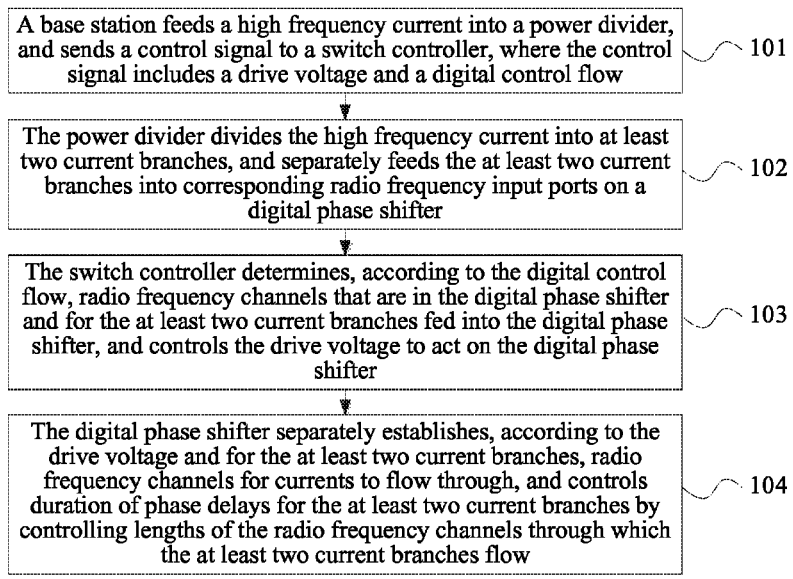
FIG. 1 is a flowchart of an embodiment of a phase control method according to the present disclosure.

FIG. 1 is a flowchart of an embodiment of a phase control method according to the present disclosure. As shown in FIG. 1, the method in this embodiment may include Step 101: A base station feeds a high frequency current into a power divider, and sends a control signal to a switch controller, where the control signal includes a drive voltage and a digital control flow.

This embodiment applies to a phase control system that is based on a digital phase shifter, where the phase control system includes a base station, a power divider, a switch controller, and a digital phase shifter, and the digital phase shifter includes MEMS switches and microstrips that connect the MEMS switches.

The base station includes two external ports: a radio frequency port and a control port, where the high frequency current is fed into the power divider by using the radio frequency port, and the control signal is sent to the switch controller by using the control port; the high frequency current is an object on which the digital phase shifter performs phase shifting, and the control signal is information that is sent by the base station and used to control how to implement the phase shifting, where the control signal includes the drive voltage and the digital control flow, and the digital control flow may be a binary data flow including "0" and "1".

Step 102: The power divider divides the high frequency current into at least two current branches, and separately feeds the at least two current branches into corresponding radio frequency input ports on a digital phase shifter.

The power divider is a device that divides one channel of input signal energy into two or more channels that output equal energy. The high frequency current fed into the power divider is divided into the at least two current branches. A specific quantity of current branches into which the high frequency current is divided is determined by the purpose and scale of the array antenna. For example, if the array antenna needs six channels of input currents, a one-into-six power divider may be configured, the high frequency current is divided into six current branches by using this power divider, and then the six current branches are separately fed into six radio frequency input ports of the digital phase shifter.

Step 103: The switch controller determines, according to the digital control flow, radio frequency paths that are in the digital phase shifter and for the at least two current branches fed into the digital phase shifter, and controls the drive voltage to act on the digital phase shifter.

The switch controller identifies the digital control flow sent by the base station, that is, the foregoing binary data flow, and combinations of 0 and 1 on bits of the binary data flow are one-to-one corresponding to radio frequency paths in the digital phase shifter. For example, the binary data flow has four bits that may correspond to 16 combinations of 0 and 1, which are 0000, 0001, 0010, . . . , and 1111, and therefore the switch controller may have 16 options of radio frequency paths, and the switch controller may determine a radio frequency path for one current branch according to the 4-bit binary flow sent by the base station. In the foregoing example of six current branches, control information sent by the base station to the switch controller may include six digital control flows that are separately used to determine radio frequency paths for the six current branches. Based on the digital control flow, the switch controller may control the drive voltage to act on the digital phase shifter, that is, control connection directions of the MEMS switches in the digital phase shifter by using the drive voltage.

Step 104: The digital phase shifter separately establishes, according to the drive voltage and for the at least two current branches, radio frequency paths for currents to flow through, and controls duration of phase delays for the at least two current branches by controlling lengths of the radio frequency paths through which the at least two current branches flow.

The digital phase shifter establishes, according to the action of the drive voltage, the radio frequency paths for currents to flow through. The digital phase shifter separately establishes the radio frequency paths for the at least two current branches according to connection directions in which the drive voltage drives the MEMS switches in the digital phase shifter, and by using the MEMS switches and microstrips that connect the MEMS switches; and the digital phase shifter controls the duration of the phase delays for the at least two current branches by controlling the lengths of the radio frequency paths.

The digital phase shifter includes multiple MEMS switches, where the MEMS switches have a single pole double throw function, the MEMS switches are corresponding to bits in the digital control flow, and microstrips of different lengths are connected to the MEMS switches in two connection directions of the MEMS switches. 0 and 1 on one bit separately correspond to the two connection directions of one MEMS switch, and therefore one combination of 0 and 1 in the digital control flow may correspond to the radio frequency path of one current branch in the digital phase shifter. The digital phase shifter implements corresponding phase delays for the at least two current branches by using the lengths of the radio frequency paths. This is because the current branches input to the digital phase shifter have a same wavelength and a same phase, and pass through radio frequency paths of different lengths in the digital phase shifter, and therefore the current branches correspond to different phases when being output from the digital phase shifter.

In this embodiment, a base station outputs a control signal, to determine radio frequency paths of current branches that flow through a digital phase shifter, and phases of the current branches are delayed by using lengths of the radio frequency paths, thereby implementing high-precision phase shifting that is based on a digital domain for an array antenna.

Figure 2:
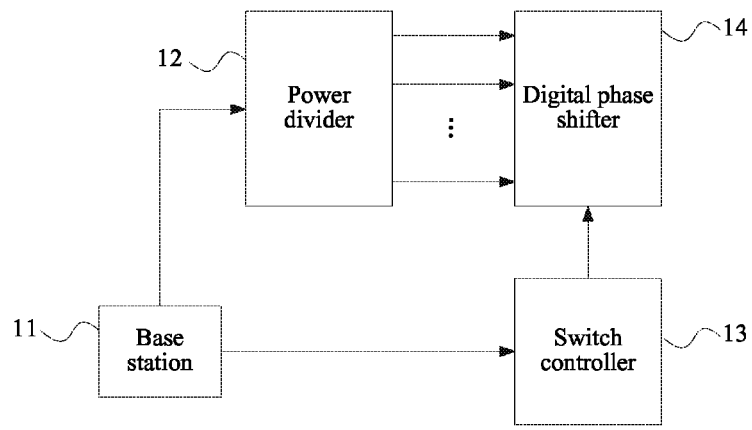
FIG. 2 is a schematic structural diagram of an embodiment of a phase control system according to the present disclosure.

FIG. 2 is a schematic structural diagram of an embodiment of a phase control system according to the present disclosure. As shown in FIG. 2, the system in this embodiment may include: a base station 11, a power divider 12, a switch controller 13, and a digital phase shifter 14, where a radio frequency port of the base station 11 is electrically connected to an input port of the power divider 12 by using a radio frequency transmission line, a drive port of the base station 11 is electrically connected to the switch controller 13 by using a control line, the switch controller 13 is electrically connected to the digital phase shifter 14, and an output port of the power divider 12 is electrically connected to a radio frequency input port of the digital phase shifter 14 by using a radio frequency transmission line; and the power divider 12, the digital phase shifter 14, the switch controller 13, and the radio frequency transmission lines form a feeding network. The electrical connection in this embodiment may be direct welding, that is, metals are directly connected; and may also be connection by means of coupling, that is, metals are spaced by an object and not directly connected, but are still connected in terms of radio frequency so that signals can be transmitted therebetween. The base station 11 is configured to feed a high frequency current into the power divider 12, and send a control signal to the switch controller 13, where the control signal includes a drive voltage and a digital control flow; the power divider 12 is configured to divide the high frequency current into at least two current branches, and separately feed the at least two current branches into corresponding radio frequency input ports on the digital phase shifter 14; the switch controller 13 is configured to determine, according to the digital control flow, radio frequency paths that are in the digital phase shifter 14 and for the at least two current branches fed into the digital phase shifter 14, and control the drive voltage to act on the digital phase shifter 14; and the digital phase shifter 14 is configured to separately establish, according to the drive voltage and for the at least two current branches, radio frequency paths for currents to flow through, and control duration of phase delays for the at least two current branches by controlling lengths of the radio frequency paths through which the at least two current branches flow.

The base station 11 in this embodiment may include but are not limited to the following types of base stations: a Global System for Mobile Communications (GSM) base station, a Code Division Multiple Access (CDMA) base station, a CDMA2000 base station, a Time Division-Synchronous Code Division Multiple Access (TD-SCDMA) base station, a Frequency Division Duplex-Long Term Evolution (FDD-LTE) base station, and a Time Division Duplex (TDD)-LTE base station. The base station 11 includes a building baseband unit (BBU) and a radio remote unit (RRU), provides the high frequency current, and controls the drive voltage and the digital control flow of the switch controller 13. The base station 11 may use a direct current 48 voltage (V) provided by an Antenna Interface Standards Group (AISG) standard port as the drive voltage.

The foregoing digital phase shifter 14 may include MEMS switches and microstrips that connect the MEMS switches. The digital phase shifter 14 uses a base board, which carries multiple passive and conductive phase delay components, as a base; multiple MEMS switches are disposed on the base to couple and select phase delay components, and then multiple radio frequency paths of different lengths are formed by using the microstrips.

Based on a structure of the foregoing phase control system, an operating principle of the phase control system is that after the high frequency current provided by the base station 11 is fed into the power divider 12 through the radio frequency port, the power divider 12 divides one channel of input signal energy into two or more channels that output equal or unequal output signal energy, and a certain degree of isolation should be ensured between output ports of the power divider 12. Generally, the power divider divides the input signal energy into equal values; and a cascading manner of an impedance transformation line is determined and an isolation resistance is selected, so that the power divider has a characteristic of a very wide frequency band. In the digital phase shifter 14, a phase delay module includes the base that carries the multiple passive and conductive phase delay components, an MEMS module includes the multiple MEMS switches that are configured to couple, between an input and an output, selected phase delay components, and a connection module is configured to electrically couple the phase delay components of the phase delay module with the MEMS switches of the MEMS module. The power divider 12, the digital phase shifter 14, and several radio frequency transmission lines form the feeding network, to adjust the high frequency current that is input to the array antenna to a needed phase and power.

In the system of this embodiment, an analog phase shifter in an existing remote electrical tilt antenna is replaced with a digital phase shifter that is based on a digital domain, a mechanical transmission apparatus in the existing remote electrical tilt antenna is replaced with a switch controller, and mechanical transmission is no longer needed in the phase control system; in the entire phase control system, a base station can uniformly control phases by controlling radio frequency signals by using the digital domain, a phase deviation of the digital phase shifter is small, and a beam can be precisely adjusted.

Figure 3:
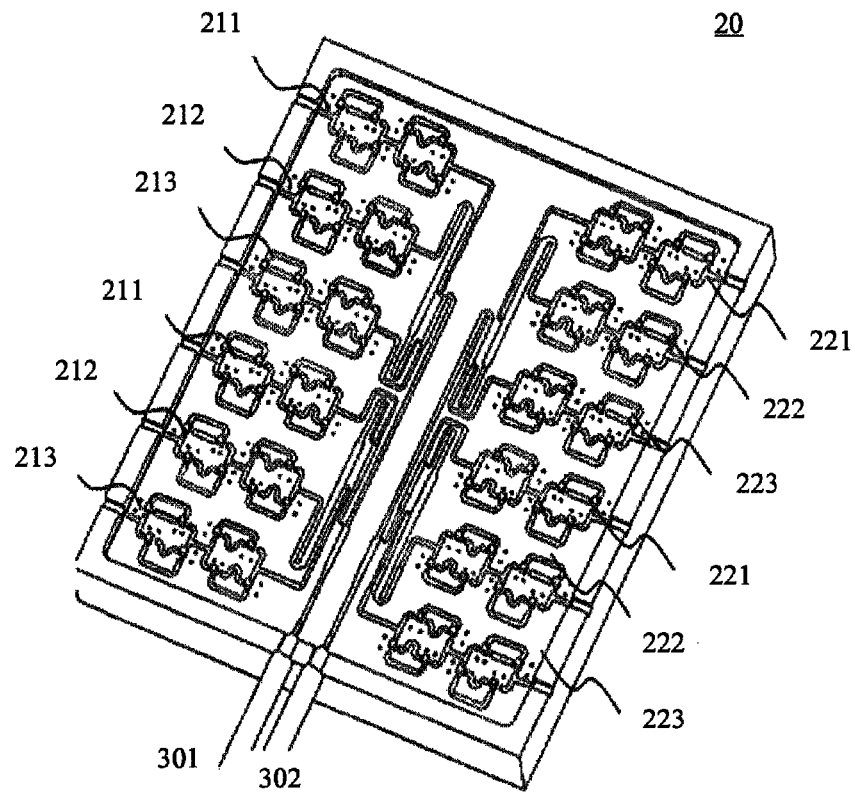
FIG. 3 is a schematic structural diagram of a digital phase shifter of a phase control system according to the present disclosure.

FIG. 3 is a schematic structural diagram of a digital phase shifter of a phase control system according to the present disclosure. As shown in FIG. 3, a digital phase shifter 20 includes 12 phase shifting units; the 12 phase shifting units are grouped into four groups, and each group includes three phase shifting units, where two groups of the phase shifting units (211-213) are electrically connected to a radio frequency transmission line 301, and the other two groups of the phase shifting units (221-223) are electrically connected to a radio frequency transmission line 302; the phase control system separately feeds, by using the radio frequency transmission lines 301 and 302, high frequency currents into the phase shifting units electrically connected to the radio frequency transmission lines 301 and 302.

In the phase control system in this embodiment, on paths for feeding the high frequency currents by using the radio frequency transmission line 301, the two groups of the phase shifting units (211-213) form one polarization, used to shift phases of the high frequency currents on one of polarized radiating element groups of a dual-polarized array antenna and then feed the currents; accordingly, on paths for feeding the high frequency currents by using the radio frequency transmission line 302, the other two groups of the phase shifting units (221-223) form another polarization, used to shift phases of the high frequency currents on another polarized radiating element group of the dual-polarized array antenna and then feed the currents; and the radiating element groups described above include the 12 radiating elements of the array antenna. The three phase shifting units (211-213) and (221-223) in the groups of the digital phase shifter 20 have a same structure, and output different phases because different paths are formed by closing switches.

It should be noted that, in this embodiment and subsequent embodiments, the structure of the phase control system is all described by using an example in which the digital phase shifter includes 12 phase shifting units, and the array antenna includes 12 radiating elements; and a quantity of phase shifting units and a quantity of radiating elements may be any quantities that meet a requirement of the phase control system, which are not limited herein.

Figure 4:
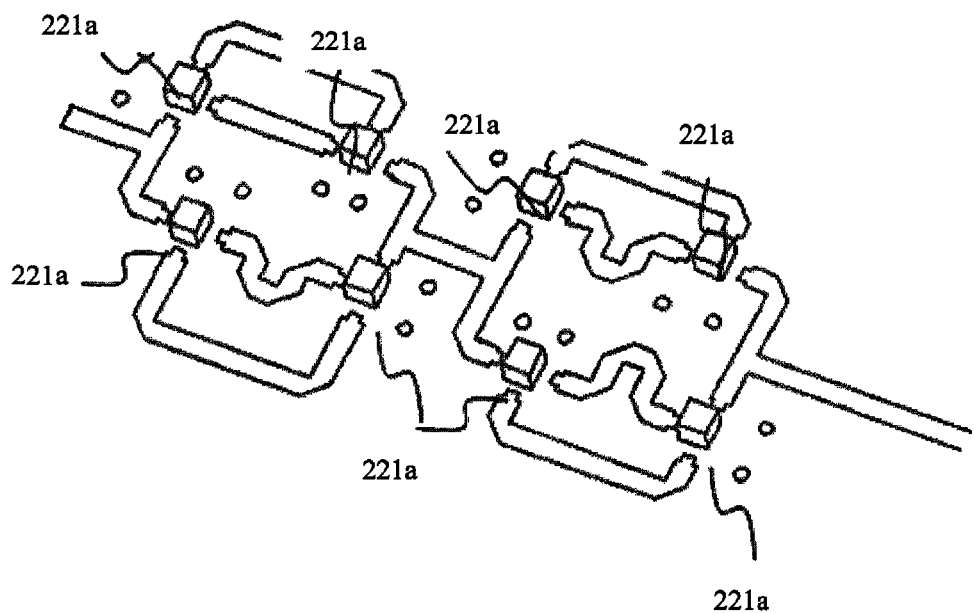
FIG. 4 is a schematic structural diagram of a phase shifting unit of a phase control system according to the present disclosure.

FIG. 4 is a schematic structural diagram of a phase shifting unit of a phase control system according to the present disclosure. With reference to FIG. 3 and FIG. 4 in combination, each phase shifting unit (for example, the phase shifting unit 221) of the phase shifter 20 includes eight MEMS switches 221a that are electrically connected to each other by using microstrips, to form at least two radio frequency paths; in an example shown in FIG. 4, there are four radio frequency paths, and on these radio frequency paths, duration of phase delays of high frequency currents are controlled by controlling lengths of the radio frequency paths. Assuming that the lengths of these four radio frequency paths are A, B, C, and D, respectively, according to a calculation formula for an alternating current, radio frequency paths of different lengths correspond to different transmission duration, and phases thereof are also different, and therefore, after the high frequency currents flow through the four radio frequency paths corresponding to A, B, C, and D, phases of the high frequency currents change; the MEMS switches 221a are configured to select different radio frequency paths by means of opening and closing of the switches, to implement phase shifting of the digital phase shifter.

In this embodiment, the MEMS switches 221a may be single pole double throw (SPDT) switches, the eight SPDT switches are electrically connected to each other by using microstrips, and combined with a combination of opening and closing of the eight SPDT switches, form a 4-bit phase shifting unit 221. That is, the phase shifting unit 221 in this embodiment controls flow lines of the high frequency currents by controlling opening and closing of the SPDT switches, thereby selecting different wave paths to achieve a purpose of phase shifting. The phase shifting unit 221 is capable of 4-bit phase shifting, and therefore may have a total of $2^4=16$ phases: 0, 5, 10, 15, 20, 25, 30, 35, 40, 45, 50, 55, 60, 65, 70, and 75. Further, the phase shifting unit 221 in this embodiment includes the eight SPDT switches and the microstrips, and may implement dimensions and specifications as follows: area≤40×40 millimeters (mm); thickness≤5 mm; a power capacity is 5 to 10 watts (W) (single path); a maximum phase stroke is 75°, and minimum step≤5°; and insert loss (IL) 0.3 decibels (dB) (single phase shifting unit). The volume of the digital phase shifter is reduced, and moreover, a phase deviation of the digital phase shifter is small, and a beam can be precisely adjusted; and in addition, the opening and closing of the SPDT switches may be controlled by using a digital domain to control a radio frequency signal, a response time is short, and adjustment is convenient.

It should be noted that, in this embodiment, a structure of the phase shifting unit is described by using the phase shifting unit 221 as an example, and structures of other phase shifting units not described are the same as the structure of the phase shifting unit 221. Details are not described again herein. In addition, that the phase shifting unit 221 includes eight SPDT switches is also an example, and the phase shifting unit may further include another quantity of SPDT switches; a quantity and a connection manner of SPDT switches determine bits of phase shifting of the phase shifting unit, and may be determined according to a function of a digital phase shifter, and are not limited herein.

Figure 5:
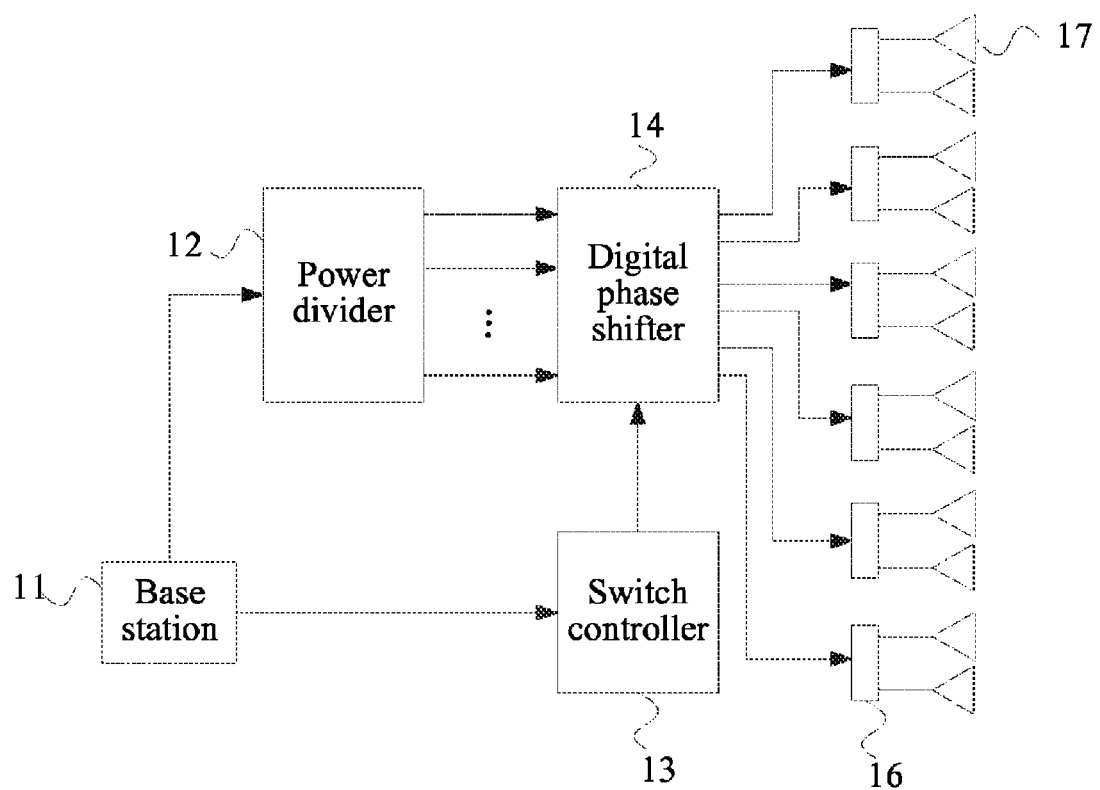
FIG. 5 is a schematic structural diagram of another embodiment of a phase control system according to the present disclosure.

FIG. 5 is a schematic structural diagram of another embodiment of a phase control system according to the present disclosure. As shown in FIG. 5, on the basis of the structure of the system shown in FIG. 2, an apparatus in this embodiment may further include 12 radiating elements 17 and six rear power dividers 16, where input ports of the rear power dividers 16 are electrically connected to a digital phase shifter 14 by using radio frequency coaxial cables, and an output port of each rear power divider 16 is electrically connected to two radiating elements 17; and the rear power dividers 16 are configured to feed, into the radiating elements 17, at least two current branches that are output from the digital phase shifter 14 and phase-delayed.

Figure 6:
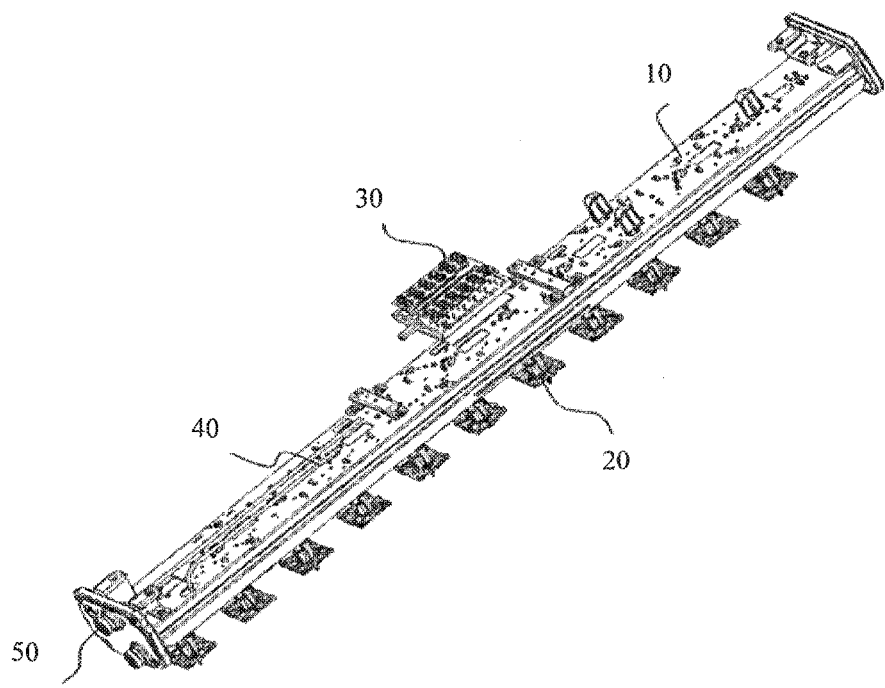
FIG. 6 is a schematic structural diagram of an embodiment of an array antenna according to the present disclosure.

FIG. 6 is a schematic structural diagram of an embodiment of an array antenna according to the present disclosure. As shown in FIG. 6, the array antenna is a dual-polarized antenna, and includes: a power divider, a switch controller, a digital phase shifter, an antenna reflection board 10, and 12 radiating elements 20; the digital phase shifter and the switch controller are integrated into a same high-resistance base board 30, where the high-resistance base board 30 may be a printed circuit board (PCB), so as to reduce lines for connecting the digital phase shifter and the switch controller, and the high-resistance base board 30 is disposed on the back of the antenna reflection board 10, so as to reduce impact on the radiating elements; the power divider and the 12 radiating elements 20 are all disposed on the antenna reflection board 10; the switch controller is electrically connected to the digital phase shifter, and an output port of the power divider is electrically connected to a radio frequency input port of the digital phase shifter by using a radio frequency transmission line, and a radio frequency output port of the digital phase shifter is electrically connected to the radiating elements 20 by using a radio frequency transmission line; a radio frequency transmission line 40 is used to feed a high frequency current; and the array antenna is electrically connected to a radio frequency port of a base station system by using an interface 50, for example, a radio frequency connector (DIN).

Optionally, the power divider in the foregoing embodiment may also be integrated, together with the digital phase shifter, into the high-resistance base board 30, to reduce line connections.

Optionally, a rear power divider may further be integrated into the high-resistance base board 30, where an input port of the rear power divider is electrically connected to one radio frequency output port of the digital phase shifter by using a radio frequency coaxial cable, and an output port of the rear power divider is electrically connected to at least one radiating element 20; and the rear power divider is configured to pass a phase change generated by the digital phase shifter on to the radiating element 20, to change a radiation direction of the array antenna.

The power divider is configured to divide the high frequency current into at least two current branches, and separately feed the at least two current branches into corresponding radio frequency input ports on the digital phase shifter; the switch controller is configured to determine, according to a digital control flow, radio frequency paths that are in the digital phase shifter and for the at least two current branches fed into the digital phase shifter, and control a drive voltage to act on the digital phase shifter; the digital phase shifter is configured to separately establish, according to the drive voltage and for the at least two current branches, radio frequency paths for currents to flow through, and control duration of phase delays for the at least two current branches by controlling lengths of the radio frequency paths through which the at least two current branches flow; and the radiating elements 20 are configured to convert, into microwave signals, the at least two current branches that are output from the digital phase shifter and phase-delayed, and transmit the microwave signals in space.

The foregoing digital phase shifter may include MEMS switches and microstrips that connect the MEMS switches.

Schematic structures of the digital phase shifter, the switch controller, and the power divider are not drawn in the schematic structural diagram in this embodiment, the structure shown in FIG. 2 may be used for the digital phase shifter and the switch controller that are integrated into the high-resistance base board 30, and the structure shown in FIG. 3 may be used for a phase shifting unit of the digital phase shifter. Details are not described again herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A phase control method, comprising:
feeding, by a base station, a high frequency current into a power divider;
sending, by a base station, a control signal to a switch controller, wherein the control signal comprises a drive voltage and a digital control flow;
dividing, by the power divider, the high frequency current into at least two current branches;
feeding the at least two current branches separately into corresponding radio frequency input ports on a digital phase shifter;
determining, by the switch controller according to the digital control flow, radio frequency paths that are in the digital phase shifter and for the at least two current branches fed into the digital phase shifter;
controlling, by the switch controller the drive voltage to act on the digital phase shifter;
establishing, by the digital phase shifter, radio frequency paths for the at least two current branches separately for currents to flow through according to connection directions in which the drive voltage drives micro electro mechanical system (MEMS) switches in the digital phase shifter, and using the MEMS switches and microstrips that connect the MEMS switches; and
controlling, by the digital phase shifter, duration of phase delays for the at least two current branches by controlling lengths of the radio frequency paths through which the at least two current branches flow.

2. The method according to claim 1, further comprising feeding, by a rear power divider into at least two radiating elements, the at least two current branches that are output from the digital phase shifter and phase-delayed.

3. The method according to claim 1, wherein the MEMS switches are single pole double throw switches.

4. The method according to claim 1, wherein a dual-polarized antenna comprises the power divider, the switch controller, and the digital phase shifter.

5. A phase control system, comprising:
a base station, wherein the base station is configured to:
  feed a high frequency current into the power divider; and
  send a control signal to the switch controller, wherein the control signal comprises a drive voltage and a digital control flow;
a power divider, wherein the power divider is configured to:
  divide the high frequency current into at least two current branches; and
  feed the at least two current branches into corresponding radio frequency input ports on the digital phase shifter separately;
a switch controller, wherein the switch controller is configured to:
  determine, according to the digital control flow, radio frequency paths that are in the digital phase shifter and for the at least two current branches fed into the digital phase shifter; and
  control the drive voltage to act on the digital phase shifter; and
a digital phase shifter, wherein the digital phase shifter comprises micro electro mechanical system (MEMS) switches and microstrips that connect the MEMS switches, and wherein the digital phase shifter is configured to:
  establish the radio frequency paths for the at least two current branches separately for currents to flow through according to connection directions in which the drive voltage drives the MEMS switches in the digital phase shifter, and by using the MEMS switches and the microstrips according to the drive voltage; and
  control duration of phase delays for the at least two current branches by controlling lengths of the radio frequency paths through which the at least two current branches flow.

6. The system according to claim 5, further comprising at least two radiating elements, wherein the radiating elements are configured to:
  convert, into microwave signals, the at least two current branches that are output from the digital phase shifter and phase-delayed; and
  transmit the microwave signals in space.

7. The system according to claim 6, further comprising a rear power divider, configured to feed, into the radiating elements, the at least two current branches that are output from the digital phase shifter and phase-delayed.

8. The system according to claim 5, wherein the MEMS switches are single pole double throw switches.

9. The system according to claim 5, further comprising twelve radiating elements, each of the twelve radiating elements configured to:
  convert, into microwave signals, the at least two current branches that are output from the digital phase shifter and phase-delayed; and
  transmit the microwave signals.

10. The system according to claim 5, wherein the digital phase shifter comprises twelve phase shifting units grouped into four groups such that each group includes three phase shifting units.

11. The system according to claim 5, wherein the digital phase shifter and the switch controller are integrated into a high-resistance base board disposed on a back of an antenna reflection board.

12. The system according to claim 5, wherein the power divider and the at least two radiating elements are disposed on an antenna reflection board.

13. A phase control system, comprising
a base station, wherein the base station is configured to:
  feed a high frequency current into a power divider; and
  send a control signal to a switch controller, wherein the control signal comprises a drive voltage and a digital control flows;
the power divider, wherein the power divider is configured to:
  divide the high frequency current into at least two current branches; and
  feed the at least two current branches into corresponding radio frequency input ports on a digital phase shifter separately;
the switch controller, wherein the switch controller is configured to:
  determine, according to the digital control flow, radio frequency paths that are in the digital phase shifter and for the at least two current branches fed into the digital phase shifter; and
  control the drive voltage to act on the digital phase shifter;
the digital phase shifter comprising micro electro mechanical system MEMS switches and microstrips that connect the MEMS switches, wherein the digital phase shifter is configured to:
  establish, according to the drive voltage and for the at least two current branches, the radio frequency paths separately for currents to flow through according to connection directions in which the drive voltage drives the MEMS switches in the digital phase shifter, and by using the MEMS switches and the microstrips; and
  control duration of phase delays for the at least two current branches by controlling lengths of the radio frequency paths through which the at least two current branches flow; and
at least two radiating elements, wherein the at least two radiating elements are configured to:
  convert, into microwave signals, the at least two current branches that are output from the digital phase shifter and phase-delayed; and
  transmit the microwave signals in space.

14. An array antenna, wherein the array antenna is a dual-polarized antenna, and comprises:
a power divider, wherein the power divider is configured to:
  divide a high frequency current into at least two current branches; and
  feed the at least two current branches into corresponding radio frequency input ports on a digital phase shifter separately;
a switch controller, wherein the switch controller is configured to:
  determine, according to a digital control flow, radio frequency paths that are in the digital phase shifter and for the at least two current branches fed into the digital phase shifter; and
  control a drive voltage to act on the digital phase shifter;
the digital phase shifter, wherein the digital phase shifter is configured to:
  establish, according to the drive voltage and for the at least two current branches, the radio frequency paths separately for currents to flow through; and control duration of phase delays for the at least two current branches by controlling lengths of the radio frequency paths through which the at least two current branches flow; and at least two radiating elements, wherein the at least two radiating elements are configured to:

convert, into microwave signals, the at least two current branches that are output from the digital phase shifter and phase-delayed; and transmit the microwave signals in space.

15. The array antenna according to claim 14, wherein the digital phase shifter comprises micro electro mechanical system (MEMS) switches and microstrips that connect the MEMS switches, and wherein the digital phase shifter is further configured to:

establish the radio frequency paths separately for the at least two current branches according to connection directions in which the drive voltage drives the MEMS switches in the digital phase shifter, and by using the MEMS switches and the microstrips; and control the duration of the phase delays for the at least two current branches by controlling the lengths of the radio frequency paths.

16. The array antenna according to claim 15, wherein the MEMS switches are single pole double throw switches.

17. The array antenna according to claim 15, further comprising a rear power divider configured to feed, into the radiating elements, the at least two current branches that are output from the digital phase shifter and phase-delayed.

18. The array antenna according to claim 14, further comprising a rear power divider configured to feed, into the radiating elements, the at least two current branches that are output from the digital phase shifter and phase-delayed.

19. The array antenna according to claim 14, wherein the digital phase shifter comprises at least two groups of phase shifting units that form one polarization and are used to shift phases of the high frequency currents.

20. The array antenna according to claim 14, further comprising an interface, wherein the array antenna is electrically connected to a radio frequency port of a base station system using the interface.

* * * * *